(12) United States Patent
Sakayori et al.

(10) Patent No.: US 10,761,512 B2
(45) Date of Patent: Sep. 1, 2020

(54) NUMERICAL CONTROLLER

(71) Applicant: FANUC CORPORATION, Minamitsuru-gun, Yamanashi (JP)

(72) Inventors: Yuuki Sakayori, Yamanashi (JP); Akira Kanemaru, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/167,875

(22) Filed: Oct. 23, 2018

(65) Prior Publication Data
US 2019/0121327 A1 Apr. 25, 2019

(30) Foreign Application Priority Data
Oct. 25, 2017 (JP) .................. 2017-206416

(51) Int. Cl.
G05B 19/4155 (2006.01)
G06F 7/57 (2006.01)

(52) U.S. Cl.
CPC .......... *G05B 19/4155* (2013.01); *G05B 2219/32423* (2013.01); *G06F 7/57* (2013.01)

(58) Field of Classification Search
CPC ...... G05B 19/4155; G05B 2219/32423; G05B 2219/34197; G06F 7/57
See application file for complete search history.

(56) References Cited

U.S. PATENT DOCUMENTS

| | | | |
|---|---|---|---|
| 5,189,624 A * | 2/1993 | Barlow | G05B 19/182 700/169 |
| 6,442,436 B1 | 8/2002 | Nogami | |
| 6,496,848 B1 * | 12/2002 | Nankaku | G05B 19/4155 718/100 |
| 6,909,937 B2 * | 6/2005 | Sugiyama | G05B 19/40938 318/568.1 |
| 7,016,760 B2 * | 3/2006 | Sugiyama | G05B 19/40938 318/568.1 |

(Continued)

FOREIGN PATENT DOCUMENTS

| | | |
|---|---|---|
| JP | 07248810 A | 9/1995 |
| JP | 10207515 A | 8/1998 |
| JP | 10289011 A | 10/1998 |

(Continued)

OTHER PUBLICATIONS

Japanese Notice of Grounds for Rejection for Japanese Application No. 2017-206416, dated Nov. 12, 2019 with translation, 6 pages.

*Primary Examiner* — Charles R Kasenge
(74) *Attorney, Agent, or Firm* — RatnerPrestia

(57) ABSTRACT

A numerical controller which can provide an interface that performs a safe task control for addition of an original function includes a memory management unit that develops, on a memory, a program executed by a task, an execution time calculation unit that calculates an execution time of the task, an execution condition setting unit that sets an execution condition of the task based on the results of execution of the memory management unit and the execution time calculation unit, a task monitoring unit that monitors the state of an arithmetic unit and determine the arithmetic unit to which the task is assigned, and a task control unit that registers and starts the task in the assigned arithmetic unit, based on the execution condition.

5 Claims, 9 Drawing Sheets

(56) References Cited

U.S. PATENT DOCUMENTS

| | | | | |
|---|---|---|---|---|
| 7,949,501 B1* | 5/2011 | Iravani | ............ | G05B 19/41885 703/6 |
| 2016/0321037 A1 | 11/2016 | Ono et al. | | |

FOREIGN PATENT DOCUMENTS

| JP | 2000-293386 A | 10/2000 |
|---|---|---|
| JP | 2001125797 A | 5/2001 |
| JP | 2006048231 A | 2/2006 |
| JP | 2016207166 A | 12/2016 |

* cited by examiner

FIG. 10

MACHINING PROGRAM

@@START[A];

@@START[B];

@@HOLD[A];
@@DELETE[A];
M30;

FIG. 11

MACHINING PROGRAM

@@START[A];

@@START[B];

@@HOLD[A];
@@DELETE[A];
M30;

NUMERICAL CONTROLLER

CROSS-REFERENCE TO RELATED APPLICATION

This application is a new U.S. Patent Application that claims benefit of Japanese Patent Application No. 2017-206416, filed Oct. 25, 2017, the disclosure of this application is being incorporated herein by reference in its entirety for all purposes.

BACKGROUND OF THE INVENTION

Field of the Invention

The present invention relates to a numerical controller, and more particularly, to a numerical controller to which original functions can safely be added.

Description of the Related Art

There is a demand for the addition of original functions, such as state monitoring, high-speed axis control, and emergency security functions for a machine tool, to a numerical controller. In order to implement this demand, it is necessary to provide an interface for registering tasks at arbitrary timings, e.g., during operation of a machining program, a mechanism for making a specific processing resident on a memory and repeatedly executing it, and the like.

A general-purpose multi-task operating system can perform operations for registration, start, stop, and deletion of the tasks at arbitrary timings, and a software developer is provided with an interface for performing such task control according to the purpose and task execution situations. Moreover, by specifying the task start cycle and priority, the execution orders and execution times of a plurality of tasks can be managed, and the operation of the system can be adjusted more finely.

For example, Japanese Patent Application Laid-Open No. 2000-293386 describes an operating system which, if the current residual memory capacity is determined to be insufficient for execution of a new task, calculates the task utilization rate, stops a running task having the lowest utilization rate, and repeats the calculation and the task stop so that a free space is generated.

However, numerical controllers require a reliability and safety that are higher than those of general-purpose multi-task operating systems. Therefore, conventional numerical controllers are designed so that task switching timing and the like are adjusted to keep memory use rate and operation rate of a CPU appropriate, on the assumption that tasks to be executed are registered in advance. In other words, the conventional numerical controller is not based on the assumption that the tasks are registered or started at a user's desired timing.

If an interface for arbitrarily controlling tasks is simply added to such a conventional numerical controller of this type, an unexpected behavior change may be caused. If the tasks are registered or started at arbitrary timings, for example, system errors may be caused by a delay of axis control processing, reduction in communication speed, or memory exhaustion. Thereupon, the reliability and operational stability of the numerical controller may possibly be reduced. Thus, there is a demand for an interface capable of arbitrarily controlling tasks without failing to secure the reliability and safety secured.

SUMMARY OF THE INVENTION

The present invention has been made to solve the above problems and has an object to provide a numerical controller to which original functions can safely be added.

A numerical controller according to one aspect of the present invention is capable of providing an interface that performs a safe task control for addition of an original function. The numerical controller includes: a memory management unit configured to develop or initialize, on a memory, a program executed by the task, analyze the program, and acquire information on the program; an execution time calculation unit configured to calculate an execution time of the task; an execution condition setting unit configured to set an execution condition of the task based on the results of execution of the memory management unit and the execution time calculation unit; a task monitoring unit configured to monitor the state of an arithmetic unit and determine the arithmetic unit to which the task is assigned; and a task control unit configured to register and start the task in the assigned arithmetic unit, based on the execution condition.

The task control unit may stop the started task in response to a command.

The task control unit may delete the stopped task in response to a command.

The task monitoring unit may determine the arithmetic unit which executes the task, based on the idle times or sleep- or doze-mode times of a plurality of the arithmetic units.

In the numerical controller, a notification may be output if the memory management unit is not able to develop the program on the memory or if the task monitoring unit is not able to determine the arithmetic unit which executes the task.

According to the present invention, there can be provided a numerical controller to which original functions can safely be added.

BRIEF DESCRIPTION OF THE DRAWINGS

The above and other objects and features of the present invention will be obvious from the ensuing description of embodiments with reference to the accompanying drawings, in which:

FIG. 10 is a diagram showing the task stop processing in an embodiment; and

FIG. 11 is a diagram showing the task deletion processing in an embodiment.

DETAILED DESCRIPTION OF THE PREFERRED EMBODIMENTS

Figure 1:
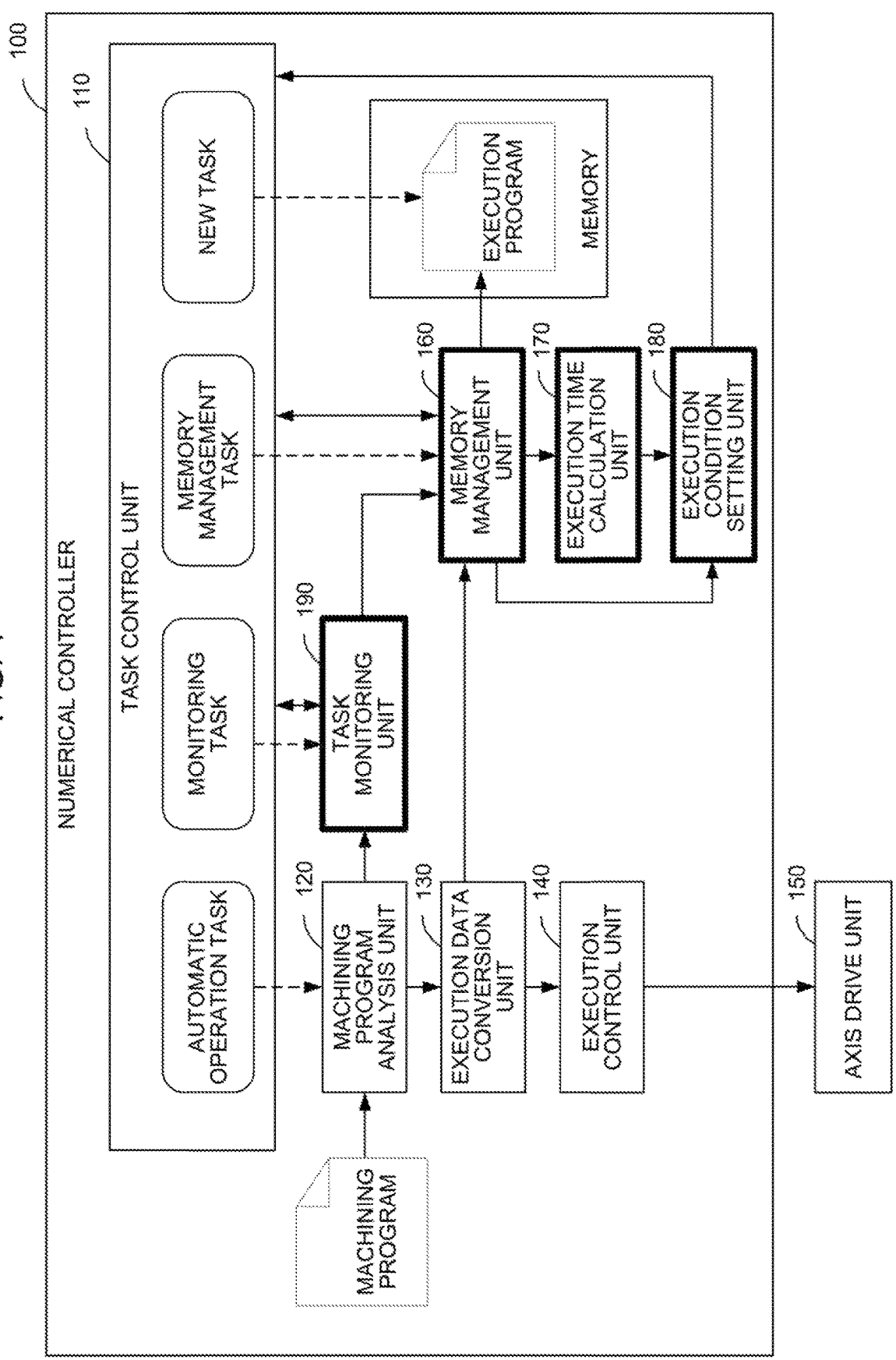
FIG. 1 is a block diagram showing the functional configuration of a numerical controller.

A numerical controller 100 according to an embodiment of the present invention will be described with reference to the accompanying drawings. FIG. 1 is a block diagram showing the functional configuration of the numerical controller 100.

The numerical controller 100 includes a task control unit 110, machining program analysis unit 120, execution data conversion unit 130, execution control unit 140, axis drive unit 150, memory management unit 160, execution time calculation unit 170, execution condition setting unit 180, and task monitoring unit 190. The numerical controller 100 typically includes a central processing unit (CPU), storage device, input/output device, and the like. These processing units are logically implemented as the CPU executes programs stored in the storage device.

The task control unit 110, machining program analysis unit 120, execution data conversion unit 130, execution control unit 140, and axis drive unit 150, as the typical constituent elements of the numerical controller, will be described first.

The task control unit 110 performs task operations, such as registration, start, stop, and deletion of tasks, task scheduling, and task resource management.

The machining program analysis unit 120 reads a machining program, performs lexical analysis block by block, and outputs a command related to machining to the execution data conversion unit 130. Moreover, according to the present embodiment, it is assumed that commands related to the tasks can be described in the machining program. The commands related to the tasks include a command group constituting an execution program and commands related to the registration, start, stop, and deletion of the tasks. The execution program is output to the execution data conversion unit 130. The commands related to the registration, start, stop, and deletion of the tasks are output to the task monitoring unit 190.

The execution data conversion unit 130 converts the command related to the machining into executable binary data and outputs it to the execution control unit 140. Moreover, if the execution program is input, the execution data conversion unit 130 converts the command group of the execution program into executable binary data and outputs it to the memory management unit 160.

The execution control unit 140 performs interpolation processing based on the executable binary data, calculates the amounts of movement of axes, and outputs them to the axis drive unit 150.

Based on the amounts of movement calculated by the execution control unit 140, the axis drive unit 150 controls current and voltage and drives the axes.

The following is a description of the memory management unit 160, execution time calculation unit 170, execution condition setting unit 180, and task monitoring unit 190, which are original constituent elements of the numerical controller 100 according to the present embodiment. Task registration processing, task start processing, task stop processing, and task deletion processing, which are characteristic functions of the present invention, are implemented by these constituent elements.

Figure 2:
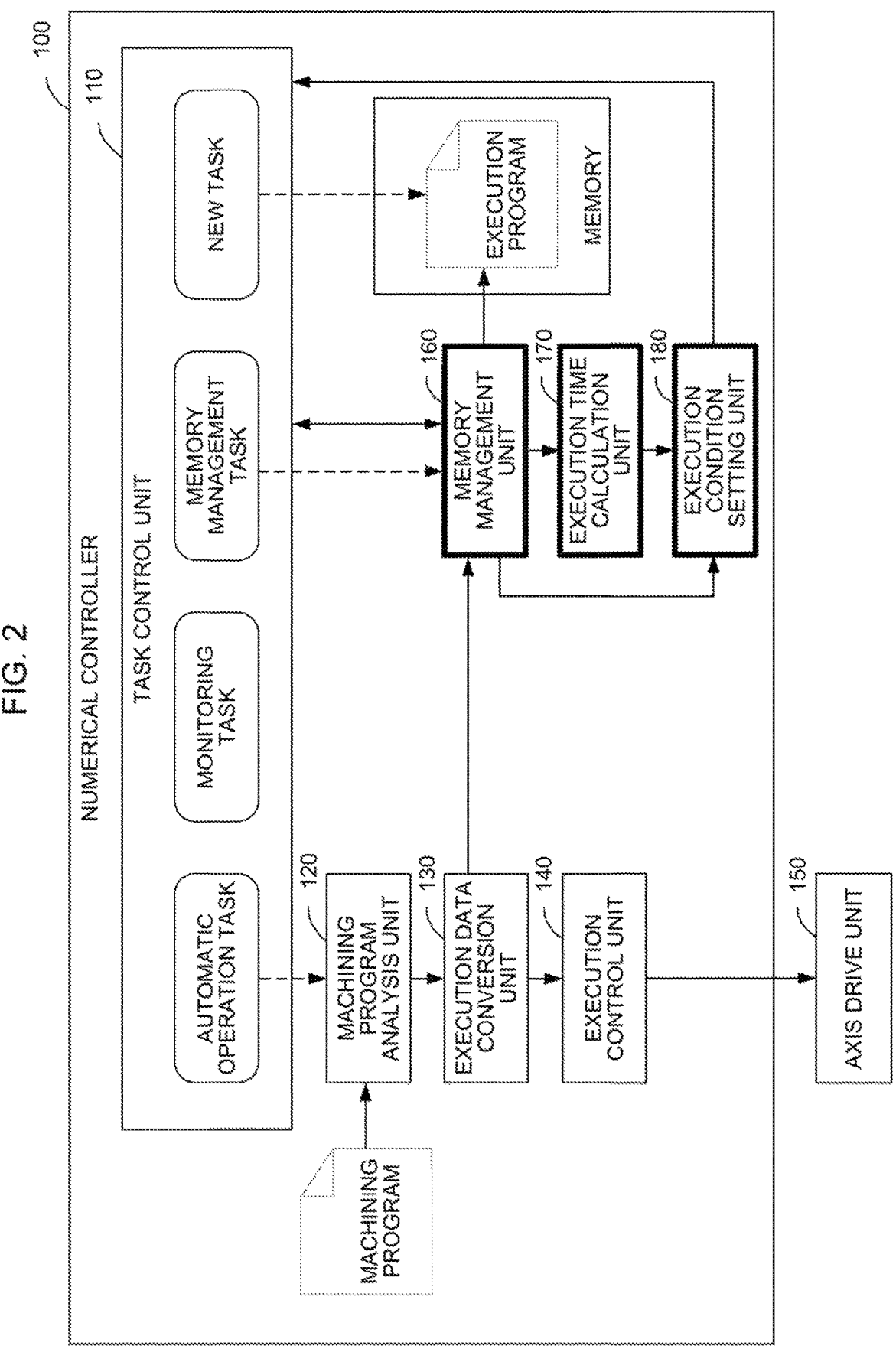
FIG. 2 is a block diagram showing constituent elements of task registration processing.

As shown in FIG. 2, the constituent elements related to the task registration processing mainly include the memory management unit 160, execution time calculation unit 170, and execution condition setting unit 180.

Figure 3:
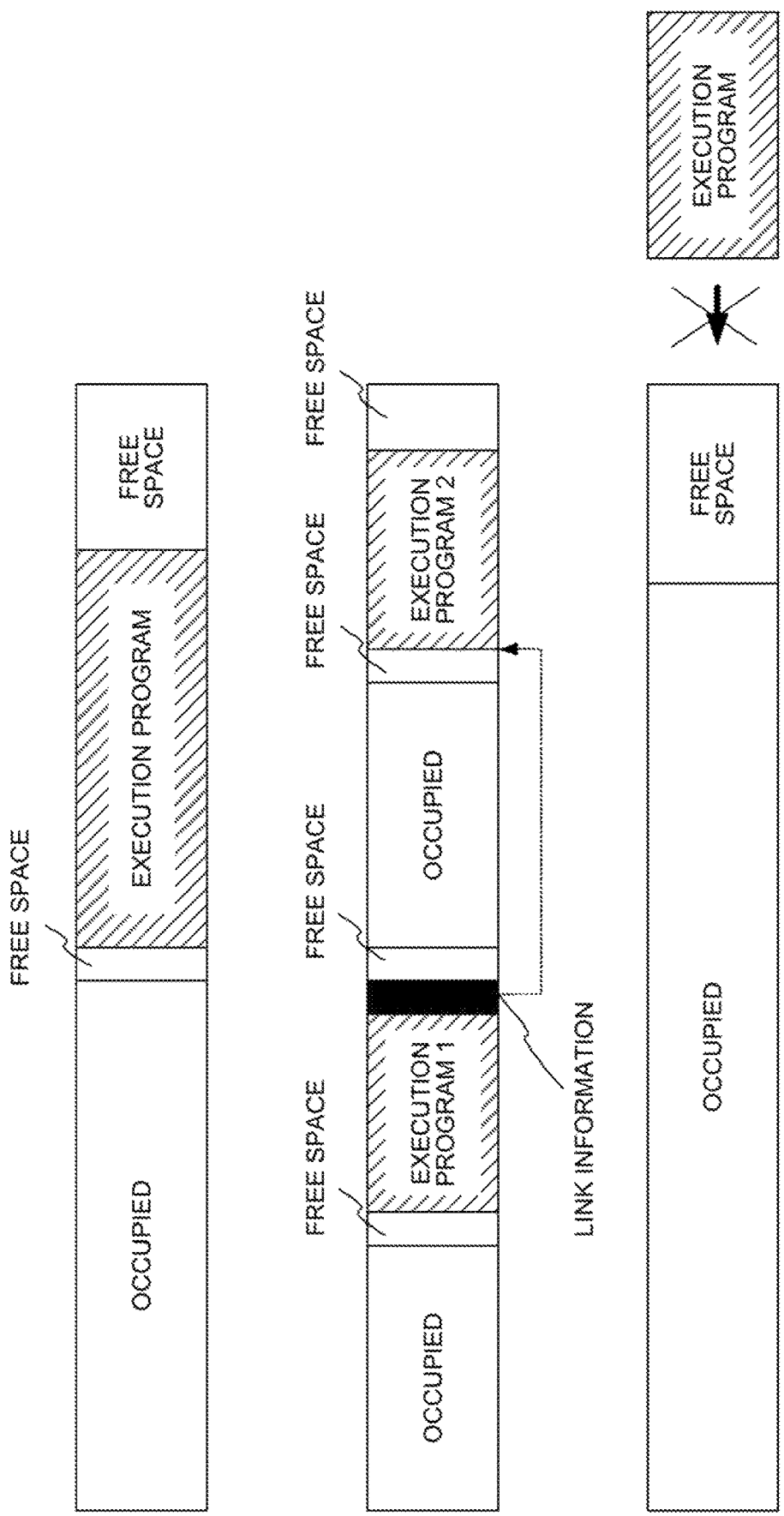
FIG. 3 is a diagram showing a method for arranging execution programs on a memory.

The memory management unit 160 temporarily saves the executable binary data of the task output from the execution data conversion unit 130 and calculates the size of the program executed by the task. Moreover, the memory management unit 160 calculates a free space on a memory and determines a method for developing the program on the memory. If a sufficient continuous free space for the development of the entire program can be secured on the memory, the program is developed in this free space (upper diagram of FIG. 3). If the entire program can be developed by adding up a plurality of free spaces, although the sufficient continuous free space for the development of the entire program cannot be secured, the program is divided into a plurality of fragments, link information is affixed to the divided programs, and then the divided programs are developed in the plurality of free spaces (middle drawing of FIG. 3). Typically, the link information is information indicative of the start address of the program fragment to be read next and is affixed to the end of each program fragment. If there is no sufficient continuous free space for the development of the entire program (lower diagram of FIG. 3), a user is notified of it by an alarm or other similar means. The user may be urged to select whether or not to continue the operation without registration of any task so that the operation can be continued or discontinued depending on the result of the selection.

Furthermore, the memory management unit 160 analyzes the program to identify the link information, the number of variables used, the types of the variables, and the like. Based on the identified information, the memory management unit 160 calculates necessary resources for the task operation and notifies the task control unit 110 of the calculated resources. Typical resources include, for example, the stack size, user authority, and account information. The task control unit 110 confirms whether or not the necessary resources can be secured and notifies the memory management unit 160 of the result of the confirmation.

The execution cycle and priority may be previously set in the machining program or previously set as parameters by the user, besides being calculated by the memory management unit 160. The execution cycle and priority described in the machining program can be acquired through the memory management unit 160 and the execution time calculation unit 170.

If the resources can be secured, the memory management unit 160 notifies the execution time calculation unit 170 and the execution condition setting unit 180 of information such as an address obtained by developing the program, program size, and task entry point (first code for the start of processing when the task is started up).

If the resources cannot be secured, in contrast, the same processing is performed as in the above-described case where the sufficient continuous free space for the development of the entire program cannot be secured.

The execution time calculation unit 170 estimates the execution time of each registered task, based on the information notified by the memory management unit 160. For example, the execution time may be a value obtained by multiplying the consumption time (number of clocks required by execution) for each instruction included in the program by the number of instructions executable by the task. Regarding an instruction group executed in a duplicate manner by loop and subprogram (subroutine) invocations and the like, times corresponding to execution frequency are summed up. The execution time calculation unit 170 notifies the execution condition setting unit 180 of the calculated execution time as task information.

The execution condition setting unit 180 classifies the information notified by the execution time calculation unit 170 into an information necessary for task registration and an information necessary for task start and notifies the task control unit 110 of the classification, thereby requiring new task registration. The information necessary for task registration includes, for example, task execution cycle, priority, stack size, and entry point. The information necessary for task start includes, for example, execution program size and task execution time.

Preferably, the task control unit 110 can adjust the task execution cycle according to the task execution time. If the task execution time is longer than the task execution cycle, it is highly possible that the task does not operate normally. Therefore, in this case, the task execution cycle is changed so that the task execution time is not longer than the task execution cycle, if possible. If impossible, the task execution cycle should be set to be as long as possible.

Figure 4:
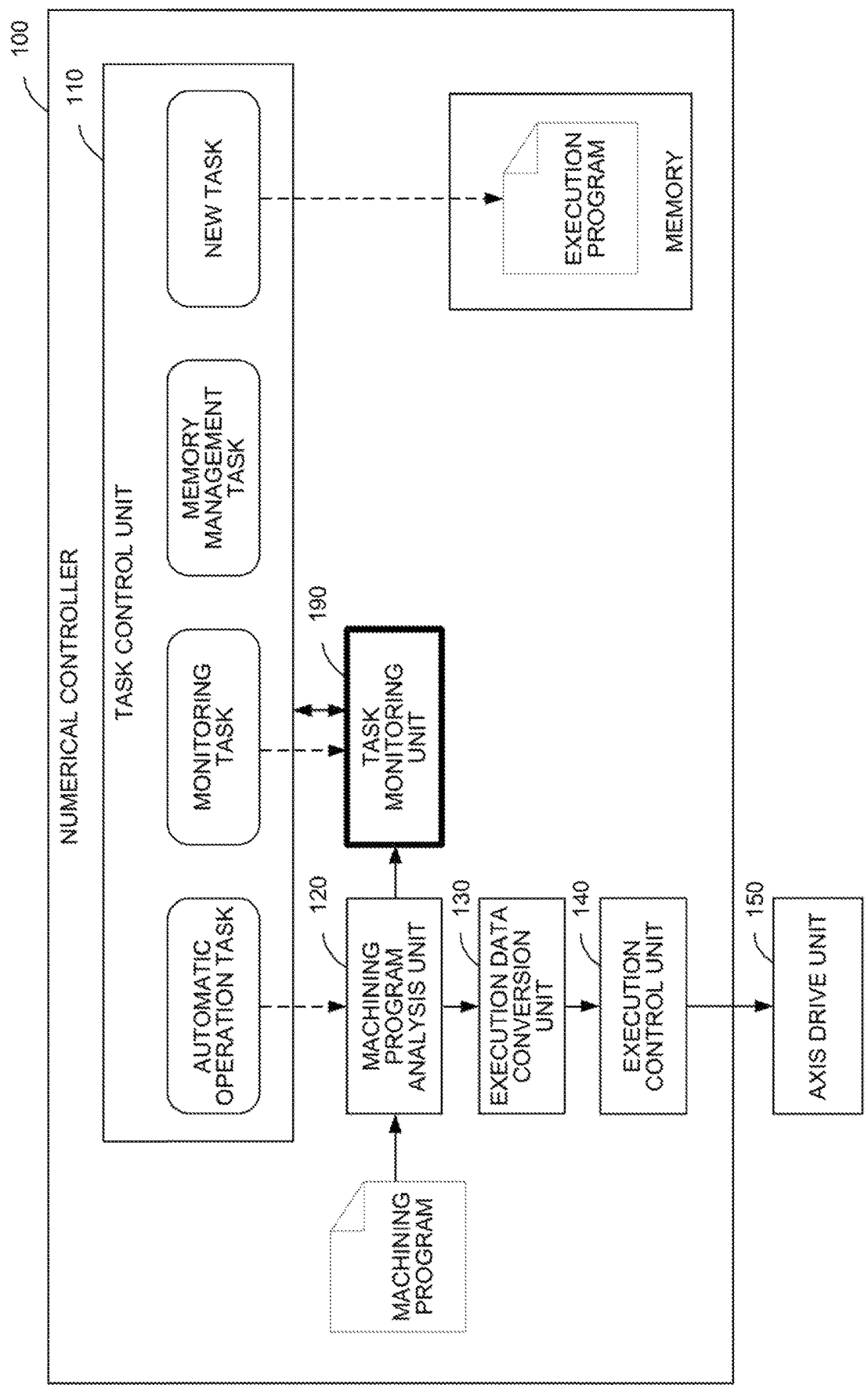
FIG. 4 is a block diagram showing constituent elements of task start processing.

As shown in FIG. 4, the constituent elements related to the task start processing mainly include the task monitoring unit 190.

Figure 5:
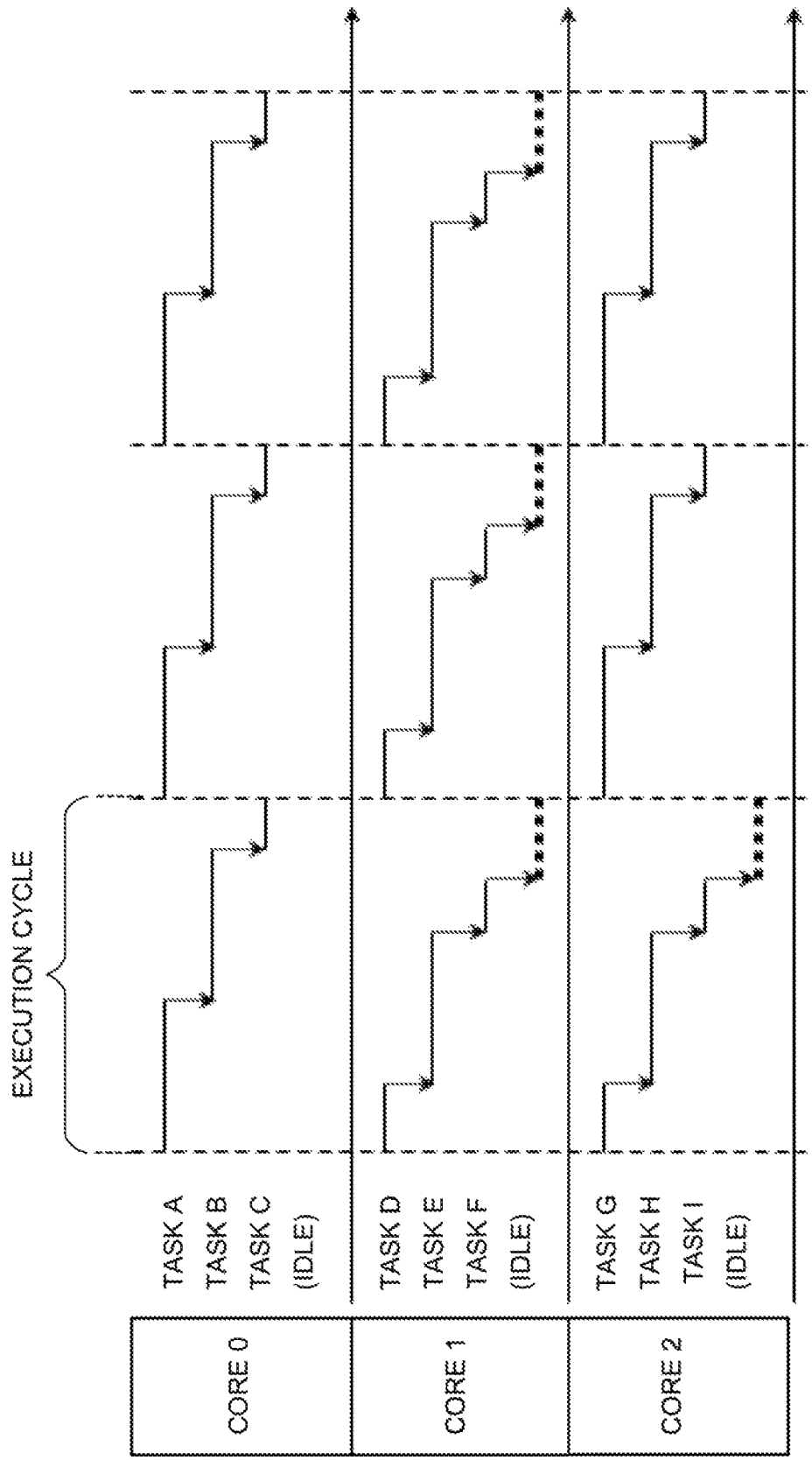
FIG. 5 is a diagram showing how tasks are executed.

If the CPU is multi-core, the task monitoring unit 190 continuously monitors the execution state of each core and determines a core that can secure the execution time of each registered task. For example, as shown in FIG. 5, an idle time (or sleep- or doze-mode time) within the execution cycle of each core is measured and a core with the task execution time not longer than the idle time is extracted as a registration destination. If a plurality of cores are extracted, the task can be assigned to a core with the longest idle time within the execution cycle. In the above judgment, an average or integrated value of idle times of a plurality of execution cycles may be compared with the task execution time. In the case of FIG. 5, for example, the integrated value of idle times (indicated by thick broken lines) of a core 1 is the largest, as a result, it is determined that the core 1 has plenty of processing time. In this case, the task monitoring unit 190 determines the core 1 to be a new task assignment destination.

When the task assignment destination is determined, the task monitoring unit 190 requests the task control unit 110 to start the task. Then, the task control unit 110 starts the task specified by the task monitoring unit 190.

If the idle times (or their average value, integrated value, etc.) of all the cores are so few that the task execution time calculated by the execution time calculation unit 170 cannot be secured, the user is notified of the fact by an alarm or other similar means. The user may be urged to select whether or not to continue the operation without registration of any task so that the operation can be continued or discontinued depending on the result of the selection.

Alternatively, tasks may be assigned to a core in which other tasks similar to the new task in priority have already run (so that the operation can be performed in an environment that facilitates average distribution of execution times in a round-robin system) or to a core in which a small number of tasks have already run (so that the operation can be performed in an environment with few other tasks influenced by new task registration).

Figure 6:
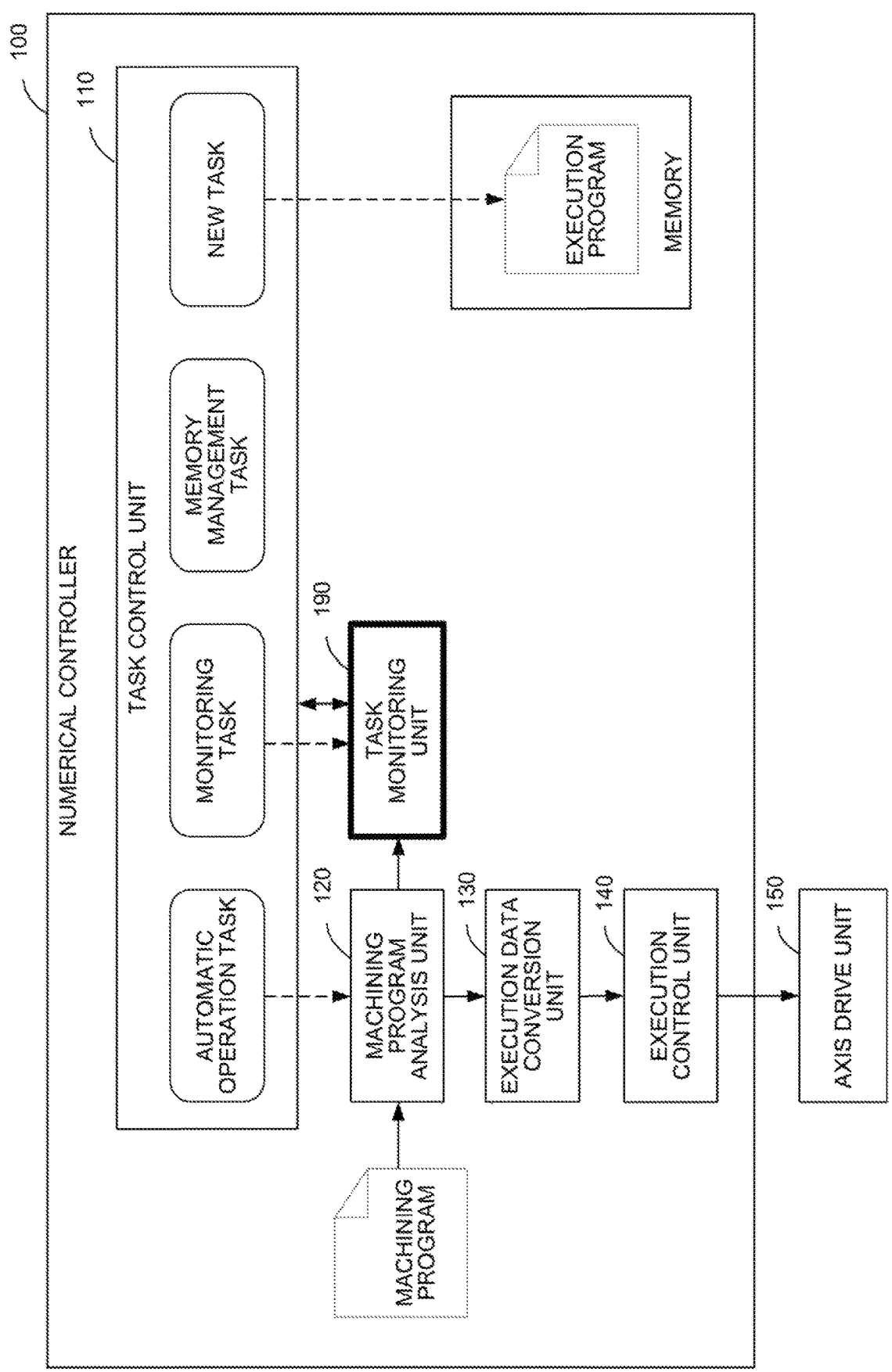
FIG. 6 is a block diagram showing constituent elements of task stop processing.

As shown in FIG. 6, the constituent elements related to the task stop processing mainly include the task monitoring unit 190.

When the task monitoring unit 190 is notified of a stop command for a specific task from the machining program analysis unit 120, it requests the task control unit 110 to stop the task. Then, the task control unit 110 stops the task specified by the task monitoring unit 190. The notification of the task stop request to the task control unit 110 should preferably be performed on completion of a series of processes being executed by the task. This is because inconsistent data may possibly remain on the memory or the machine behavior may become unstable if the task is stopped during execution.

Figure 7:
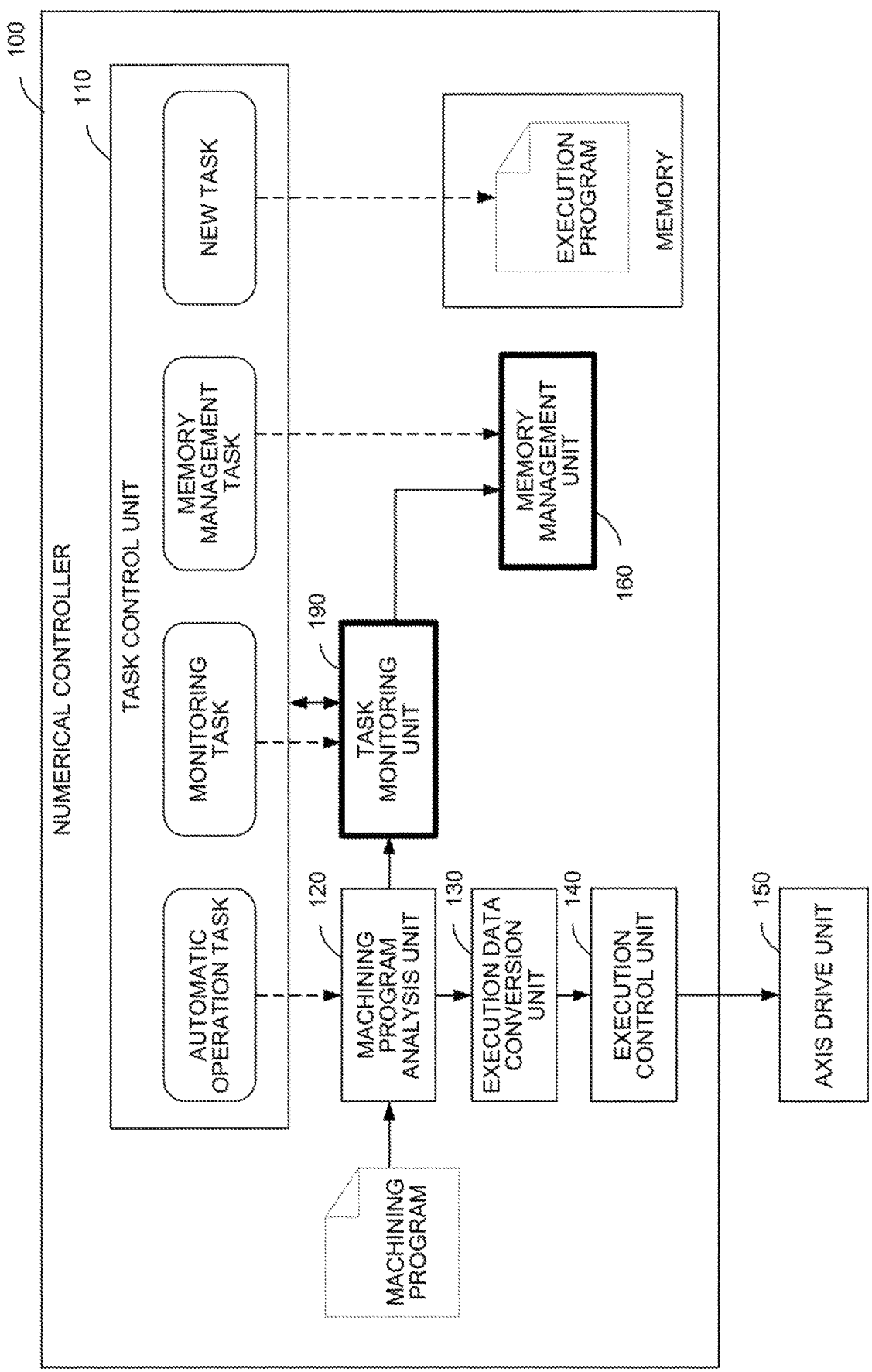
FIG. 7 is a block diagram showing constituent elements of task deletion processing.

As shown in FIG. 7, the constituent elements related to the task deletion processing mainly include the task monitoring unit 190 and the memory management unit 160.

When the task monitoring unit 190 is notified of a deletion command for a specific task from the machining program analysis unit 120, it confirms that the task is stopped. If the task is stopped, the task monitoring unit 190 requests the task control unit 110 to delete the task and notifies the memory management unit 160 of that effect.

When the memory management unit 160 is notified of the deletion request for the specific task from the task monitoring unit 190, it specifies a program that has so far been executed by the task and confirms that the program is not used by any other task. If the program is not used by any other task, the program is deleted and the memory is initialized (or released). If the program is used by some other tasks, in contrast, the program is left on the memory or only some unnecessary memory areas are initialized, whereupon the processing ends.

EMBODIMENTS

One embodiment of the numerical controller 100 will be described with reference to FIGS. 8 to 11. The numerical controller 100 according to this embodiment registers, starts, stops, and deletes tasks in response to commands described in the machining program.

(Task Registration)

Figure 8:
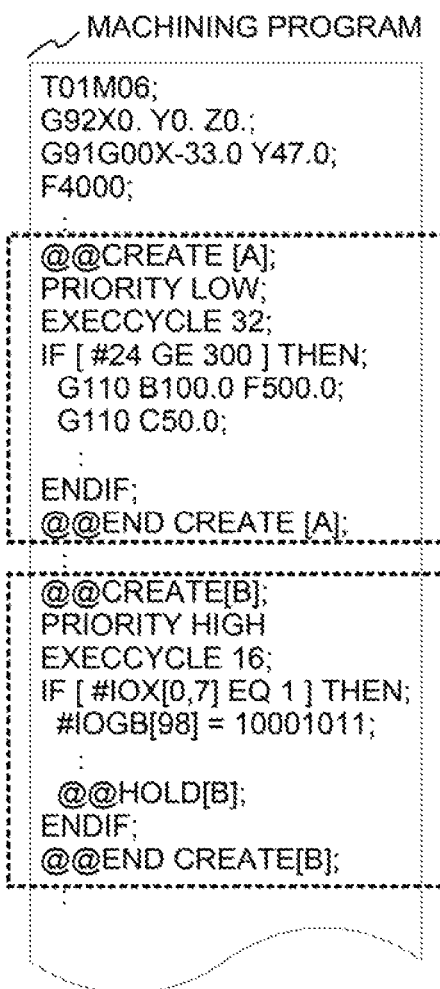
FIG. 8 is a diagram showing the task registration processing in an embodiment.

In this embodiment, as shown in FIG. 8, the command group constituting the execution program and the task registration commands (portions surrounded by broken lines in FIG. 8) can be described in the machining program. "@@CREATE [A]" is a registration command for a task [A]. "PRIORITY LOW" is a command for setting the task priority to LOW. "EXECCYCLE 32" is a command for setting the task execution cycle to 32. Blocks starting with "IF . . . " and ending with "END IF;" constitute the execution program.

The task registration commands and the command group constituting the execution program are lexically analyzed by the machining program analysis unit 120. Moreover, the command group constituting the execution program is output to the memory management unit 160 after being converted into the executable binary data by the execution data conversion unit 130.

The following is a description of examples of lexical analysis processing and binary data conversion processing based on one block "G110 C50.0;" in the machining program. First, the machining program analysis unit 120 divides a character string of the block into "G", "110", "C", "50.0", and ";". The "G" is interpreted as a code indicative of a preparatory function of the numerical controller. The "110" is interpreted as a code indicative of peripheral axis control of the preparatory function. The "C" is interpreted as a code for setting the address of a peripheral axis C. The "50.0" is interpreted as a code for storing a floating-point number 50.0 into the address of C. The ";" is interpreted as a code indicative of the end of the block.

Subsequently, the execution data conversion unit 130 generates the binary data based on the result of the lexical analysis. First, the execution data conversion unit 130 generates, for example, a binary "0x36D00000" for specifying the peripheral axis control. Then, it generates a binary "0x00001000" to which the address of C is added. Finally, the execution data conversion unit 130 generates executable binary data "0x36D010000" based on these binaries and outputs it to the memory management unit 160.

The memory management unit 160 calculates a memory size used by the received executable binary data. If there is a sufficient free space of the memory for the development of binary data, the executable binary data is registered in the memory. If there is no free space, the user is notified, by an alarm, warning, or the like, of the fact that the task cannot be registered.

Moreover, the memory management unit 160 notifies the execution time calculation unit 170 and the execution condition setting unit 180 of information indicative of various attributes of the task. The execution time calculation unit 170 calculates the execution time of the task and notifies the execution condition setting unit 180 of it. The execution condition setting unit 180 notifies the task control unit 110 of the execution time and the information indicative of the various attributes of the task and requests the registration of the task.

(Task Start)

Figure 9:
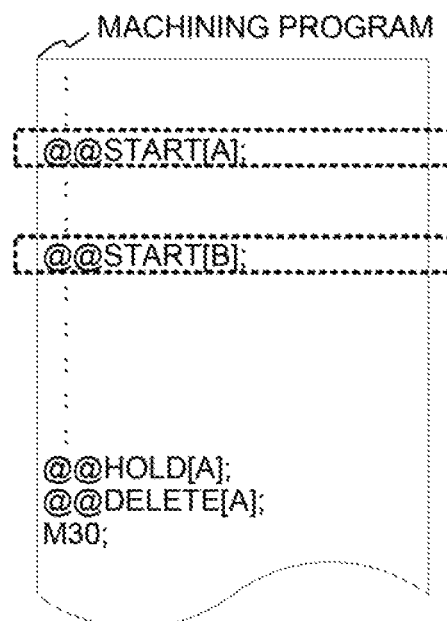
FIG. 9 is a diagram showing the task start processing in an embodiment.

In this embodiment, as shown in FIG. 9, commands (portions surrounded by broken lines in FIG. 9) for starting the task can be described in the machining program. "@@START [A]" is a start command for the task [A]. "@@START [B]" is a start command for a task [B].

When the machining program analysis unit 120 interprets the task start command, it notifies the task monitoring unit 190 to start the specified task. If an unregistered task or an already started task is specified as an object to be started, the task monitoring unit 190 notifies the user, by an alarm, warning, or the like, of the fact that the task cannot be started.

The task monitoring unit 190 monitors the execution states of all the tasks that operate in each core of the CPU and assigns a task to a core having plenty of processing time. If there is no sufficient space for execution of a new task in every CPU, the user is notified, by an alarm, warning, or the like, of the fact that the task cannot be started, without starting the task.

(Task Stop)

In this embodiment, as shown in FIG. 10, a command (portion surrounded by broken lines in FIG. 10) for stopping the task can be described in the machining program. "@@HOLD [A]" is a stop command for the task [A].

When the machining program analysis unit 120 interprets the task stop command, it notifies the task monitoring unit 190 to stop the specified task. If a task that has already been stopped is specified as an object to be stopped, the task monitoring unit 190 notifies the user, by an alarm, warning, or the like, of the fact that the task has already been stopped.

(Task Deletion)

In this embodiment, as shown in FIG. 11, a command (portion surrounded by broken lines in FIG. 11) for deleting the task can be described in the machining program. "@@DELETE [A]" is a deletion command for the task [A].

When the machining program analysis unit 120 interprets the task deletion command, it notifies the task monitoring unit 190 to delete the specified task. If a non-existing task or a running task is specified as an object to be deleted, the task monitoring unit 190 notifies the user, by an alarm, warning, or the like, of the fact that the task cannot be deleted.

If the program having been executed by the specified task is not used by any other task, the memory management unit 160 deletes the executable data of the program from on the memory. If the program is used, the memory management unit 160 deletes only some unnecessary executable data from on the memory.

According to the present embodiment, a safe task control interface for adding original functions can be provided in the numerical controller 100.

While an embodiment of the present invention has been described above, the invention is not limited to the above-described embodiment or examples and may be suitably modified and embodied in various forms.

For example, in the processing described according to the above embodiment, the task monitoring unit 190 determines the core to be the task assignment destination in the case where the CPU is multi-core. However, the present invention is not limited to this and the same processing can be performed if a CPU to be the task assignment destination is determined in the case where a plurality of CPUs exist or if an information processor to be the task assignment destination is determined in the case where a plurality of information processors exist, for example. In the present invention, the cores, CPUs, and information processors are collectively called "arithmetic units", which execute tasks.

Moreover, the task registration, start, stop, and deletion commands in an embodiment are given by way of example only and can be described in any other forms.

The invention claimed is:

1. A numerical controller capable of providing an interface that performs a safe task control for addition of an original function, the numerical controller comprising:
   a processor configured to:
      develop, on a memory, a program executed by a task, analyze the program, and acquire information on the program;
      calculate an execution time of the task based on the information;
      monitor an execution state of an arithmetic unit;
      measure an idle time within an execution cycle of the arithmetic unit;
      determine the arithmetic unit to which the task is assigned based on the idle time within the execution cycle; and
      register and start the task in the arithmetic unit to which the task has been assigned.

2. The numerical controller according to claim 1, wherein the processor stops the started task in response to a command.

3. The numerical controller according to claim 2, wherein the processor deletes the stopped task in response to a command.

4. The numerical controller according to claim 1, wherein the processor determines the arithmetic unit which executes the task, based on the idle times or sleep- or doze-mode times of a plurality of arithmetic units.

5. The numerical controller according to claim 1, wherein a notification is output if the processor is not able to develop the program on the memory or if the processor is not able to determine the arithmetic unit which executes the task.

* * * * *